US006880571B2

(12) United States Patent
Lin (10) Patent No.: US 6,880,571 B2
(45) Date of Patent: Apr. 19, 2005

(54) GAS REGULATING VALVE (76) Inventor: Wuu-Hung Lin, No. 71, Alley 23, Lane 493, Sec. 3, Chung Sun Rd., Tan Tsu Hsiang, Taichung (TW)

( * ) Notice: Subject to any disclaimer, the term of this patent is extended or adjusted under 35 U.S.C. 154(b) by 137 days.

(21) Appl. No.: 10/447,487

(22) Filed: May 28, 2003

(65) Prior Publication Data
US 2004/0238049 A1 Dec. 2, 2004

(51) Int. Cl.[7] .................................. F16K 5/02
(52) U.S. Cl. .................................. 137/599.17
(58) Field of Search .................................. 137/599.17

(56) References Cited

U.S. PATENT DOCUMENTS

| | | | |
|---|---|---|---|
| 3,292,660 A | * | 12/1966 | Zarybnicky ............ 137/599.17 |
| 5,027,854 A | * | 7/1991 | Genbauffe ............ 137/599.17 |
| 5,975,135 A | * | 11/1999 | Aguirre-Esponda et al. ..... 137/599.17 |

* cited by examiner

Primary Examiner—John Fox
(74) Attorney, Agent, or Firm—DLA Piper Rudnick Gray Cary US LLC (57) ABSTRACT

A gas regulating valve includes a valve housing. A tubular valve member is received in the valve housing, defines a valve space, and is formed with a valve seat. The valve seat defines a valve opening, and divides the valve space into a gas feed portion and a gas supply portion. A valve stem is provided with a valve piece that extends into and that is axially movable relative to the valve member. Rotation of the valve stem results in corresponding rotation of the valve member and further results in translation of the valve piece. Translation of the valve piece toward and away from the valve opening enables the valve piece to respectively reduce and increase amount of gas flowing from the gas feed portion into the gas supply portion through the valve opening.

15 Claims, 7 Drawing Sheets

GAS REGULATING VALVE

BACKGROUND OF THE INVENTION

1. Field of the Invention

The invention relates to a gas regulating valve, more particularly to a gas regulating valve which is capable of regulating the amount of gas flowing from a gas source to a gas consuming device.

2. Description of the Related Art

A conventional gas feed valve includes a main body that is formed with a valve mounting portion. The valve mounting portion is confined by an inner wall surface that surrounds an axis. The inner wall surface is formed with a radially disposed gas inlet bore that is adapted to be connected to a gas source and is further formed with an axially extending gas outlet bore that is adapted to be connected to a gas consuming device. A tubular valve member is received in the valve mounting portion, is rotatable about the axis, and has inner and outer valve surfaces. The inner valve surface surrounds the axis and defines a gas passageway that is fluidly communicated with the gas outlet bore. The outer valve surface is in sliding contact with the inner wall surface of the valve mounting position. The valve member is formed with a large gas feed orifice and at least a small gas feed orifice through the inner and outer valve surfaces. The gas feed orifices are angularly spaced apart from each other and are in fluid communication with the gas passageway.

When the valve member is rotated so as to register the large gas feed orifice with the gas inlet bore, the amount of gas flowing from the gas inlet bore into the gas outlet bore through the gas passageway is at a maximum.

When the valve member is rotated so as to register the small gas feed orifice with the gas inlet bore, the amount of gas flowing from the gas inlet bore into the gas outlet bore through the gas passageway is at a minimum.

When the valve member is rotated so as to register both the small gas feed orifice and a portion of the large gas feed orifice with the gas inlet bore, the amount of gas flowing from the gas inlet bore into the gas outlet bore through the gas passageway is between the maximum and minimum values.

Although the aforementioned conventional gas feed valve achieves the purpose of regulating the amount of gas flowing from the gas source to the gas consuming device, gas flow can only be controlled among maximum, intermediate and minimum values.

SUMMARY OF THE INVENTION

Therefore, the object of the present invention is to provide a gas regulating valve that is capable of increasing and reducing amount of gas flowing from a gas source to a gas consuming device within a range of values.

According to the present invention, a gas regulating valve comprises a valve housing, a tubular valve member, and a valve stem. The valve housing confines an interior space and is formed with a stem opening for access into the interior space. The stem opening has an axis. The interior space has a stem mounting portion and a valve mounting portion respectively disposed proximate to and distal from the stem opening along the axis. The valve mounting portion is confined by an inner wall surface that surrounds the axis. The inner wall surface is formed with a radially disposed gas inlet bore that is adapted to be connected to the gas source. The valve member is received in the valve mounting portion of the interior space and is rotatable about the axis. The valve member has an outer valve surface in sliding contact with the inner wall surface of the valve mounting portion and an inner valve surface that surrounds the axis and that defines a valve space. The inner valve surface is formed with a radial inward annular valve seat that defines a valve opening registered with the axis. The valve seat divides the valve space into a gas feed portion and a gas supply portion respectively disposed proximate to and distal from the stem opening along the axis. The gas supply portion is adapted to be disposed in fluid communication with the gas consuming device. The valve member is provided with a gas feed orifice that is formed through the inner and outer valve surfaces, and that is in fluid communication with the gas feed portion. The outer valve surface is formed with a gas feed channel to fluidly communicate the gas feed orifice with the gas inlet bore when the valve member is rotated about the axis to register the gas feed channel with the gas inlet bore. The valve stem has an operating stem portion that is disposed outwardly of the valve housing, and a valve coupling portion that extends along the axis from the operating stem portion into the stem mounting portion through the stem opening. The valve coupling portion is provided with a frusto conical valve piece distal from the operating stem portion. The valve piece extends along the axis into the gas feed portion of the valve member, and has a smallest cross-section smaller than the valve opening in the valve seat. The valve coupling portion is coupled co-rotatably to the valve member and is movable along the axis relative to the valve member. The valve coupling portion is further coupled rotatably to the valve housing such that rotation of the operating stem portion about the axis results in corresponding rotation of the valve member and further results in translation of the valve piece along the axis in the gas feed portion of the valve member. Translation of the valve piece toward the valve opening enables the valve piece to reduce amount of gas flowing from the gas feed portion into the gas supply portion through the valve opening. Translation of the valve piece away from the valve opening enables the valve piece to increase the amount of gas flowing from the gas feed portion into the gas supply portion through the valve opening.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
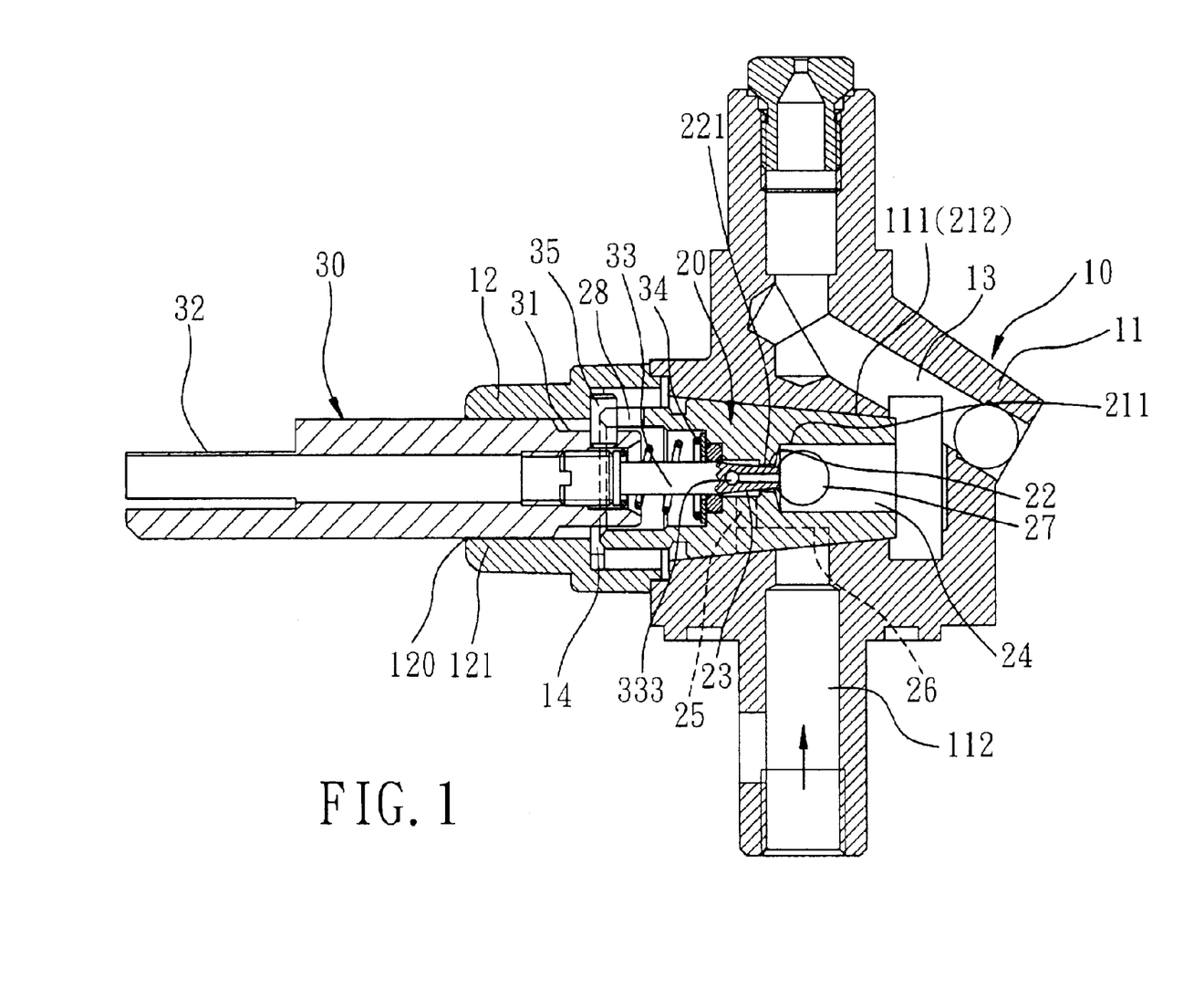
FIG. 1 is a sectional view of the preferred embodiment of a gas regulating valve according to the present invention.
Figure 2:
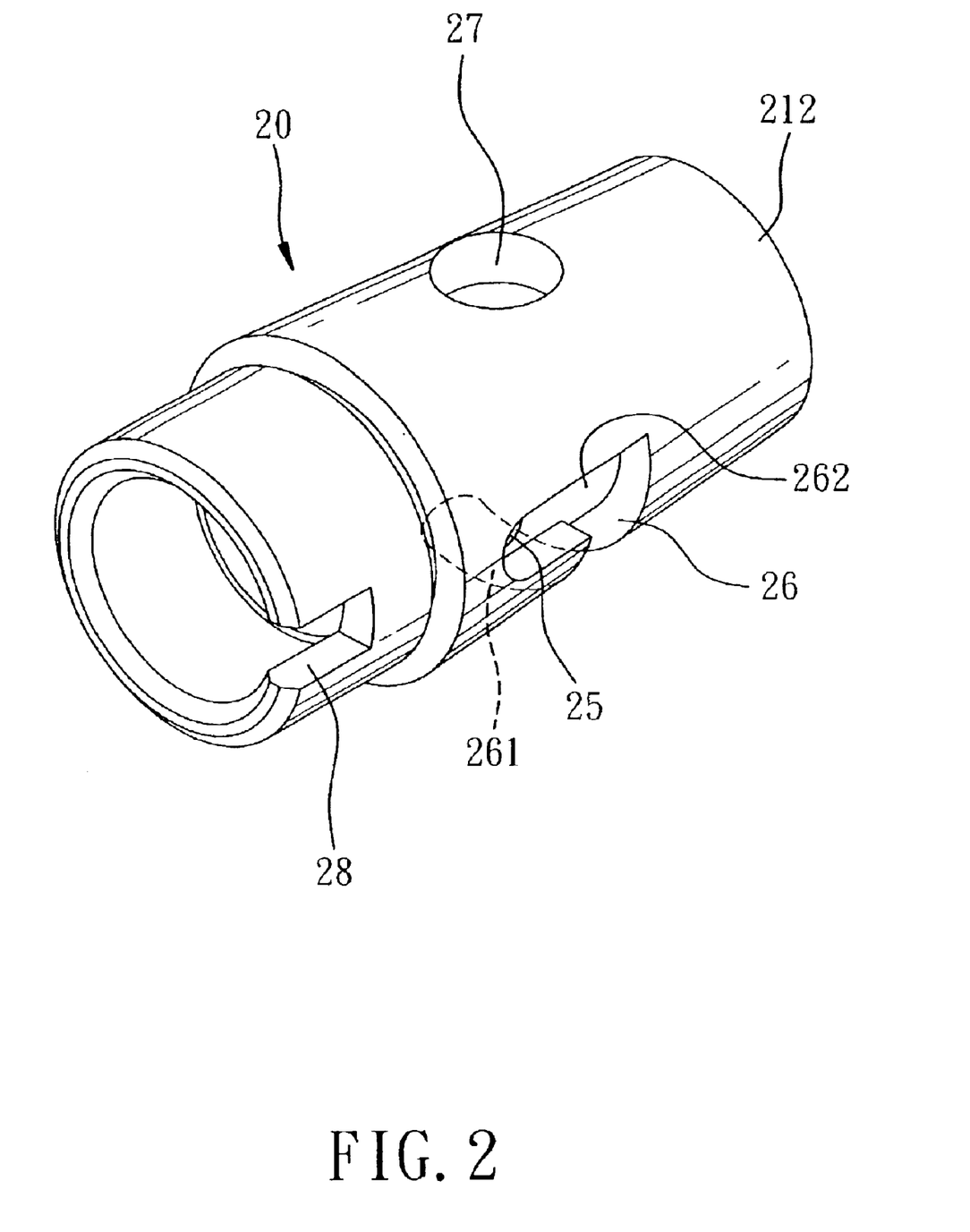
FIG. 2 is a perspective view of a valve member of the preferred embodiment.

Referring to FIGS. 1 and 2, the preferred embodiment of a gas regulating valve according to the present invention is shown to include a valve housing 10, a tubular valve member 20, and a valve stem 30.

The valve housing 10 confines an interior space that has a valve mounting portion 111 and a stem mounting portion 121, and includes a main body 11 that is formed with the valve mounting portion 111, and a valve cap 12 that is mounted on the main body 11 and that is formed with the stem mounting portion 121. The valve cap 12 is further formed with a stem opening 120 that serves as an access into the interior space and that has an axis. The stem mounting portion 121 and the valve mounting portions 111 are respectively disposed proximate to and distal from the stem opening 120 along the axis. The valve mounting portion 111 is confined by an inner wall surface that surrounds the axis. The inner wall surface is formed with a radially disposed gas inlet bore 112 that is adapted to be connected to a gas source (not shown). In this embodiment, the inner wall surface is further formed with a radially disposed gas outlet bore 13 that is adapted to be connected to a gas consuming device (not shown).

The valve member 20 is received in the valve mounting portion 111 of the interior space, is rotatable about the axis, and has an outer valve surface 212 that is in sliding contact with the inner wall surface of the valve mounting portion 111 and an inner valve surface 211 that surrounds the axis and that defines a valve space. The inner valve surface 211 of the valve member 20 is formed with a radial inward annular valve seat 22 that defines a valve opening 221 registered with the axis. The valve seat 22 divides the valve space into a gas feed portion 23 and a gas supply portion 24 respectively disposed proximate to and distal from the stem opening 120 along the axis. The valve member 20 has an open end that permits fluid communication between the gas supply portion 24 and the gas outlet bore 13 such that the gas supply portion 24 is adapted to be disposed in fluid communication with the gas consuming device.

As best shown in FIG. 2, the valve member 20 is provided with a gas feed orifice 25 that is formed through the inner and outer valve surfaces 211, 212 and that is in fluid communication with the gas feed portion 23 of the valve member 20. The outer valve surface 212 of the valve member 20 is formed with a gas feed channel 26 to fluidly communicate the gas feed orifice 25 with the gas inlet bore 112 when the valve member 20 is rotated about the axis to register the gas feed channel 26 with the gas inlet bore 112. The gas feed channel 26 is generally L-shaped. In particular, the gas feed channel 26 includes a circumferentially extending section 261 that is to be registered with the gas inlet bore 112, and an axially extending section 262 that extends from the circumferentially extending section 261 to the gas feed orifice 25. In this embodiment, the valve member 20 is further provided with a radial aperture 27 that is formed through the inner and outer valve surfaces 211, 212, that is in fluid communication with the gas supply portion 24, and that is angularly spaced apart from opposite ends of the circumferentially extending section 261 of the gas feed channel 26. The radial aperture 27 fluidly communicates the gas supply portion 24 with the gas inlet bore 112 when the valve member 20 is rotated about the axis to register the radial aperture 27 with the gas inlet bore 112.

The valve stem 30 is axially movable relative to the valve housing 10, is rotatable about the axis, and has an operating stem portion 32 that is disposed outwardly of the valve cap 12 of the valve housing 10 and a valve coupling portion 31 that extends along the axis from the operating stem portion 32 into the stem mounting portion 121 through the stem opening 120. The valve coupling portion 31 is coupled co-rotatably to the valve member 20, is movable along the axis relative to the valve member 20, and is provided with a frusto conical valve piece 33. The valve piece 33 is distal from the operating stem portion 32, extends along the axis into the gas feed portion 23 of the valve member 20, and has a smallest cross-section smaller than the valve opening 221 in the valve seat 22 and a largest cross-section larger than the valve opening 221. In this embodiment, the valve piece 33 is formed with a gas passageway 333 that extends along the axis and that permits fluid communication between the gas feed portion 23 and the gas supply portion 24 through the gas passageway 333. Preferably, the valve piece 33 is coupled threadedly to the valve coupling portion 31. In this embodiment, the valve coupling portion 31 is further coupled rotatably to the valve housing 10 such that rotation of the operating stem portion 32 about the axis results in corresponding rotation of the valve member 20.

Figure 3:
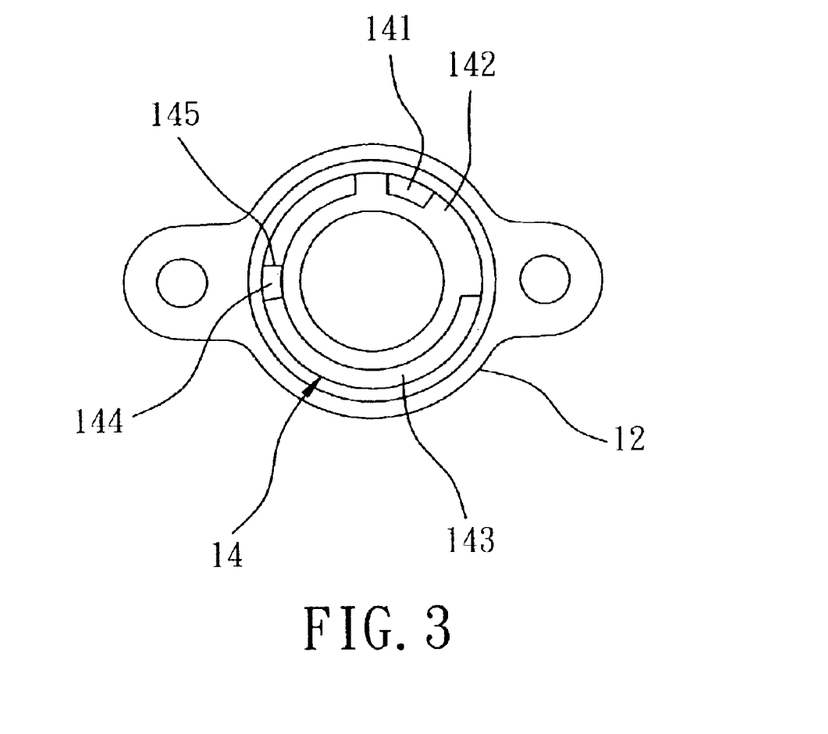
FIG. 3 is a schematic view of a cam edge on a valve cap of a valve housing of the preferred embodiment.
Figure 4:
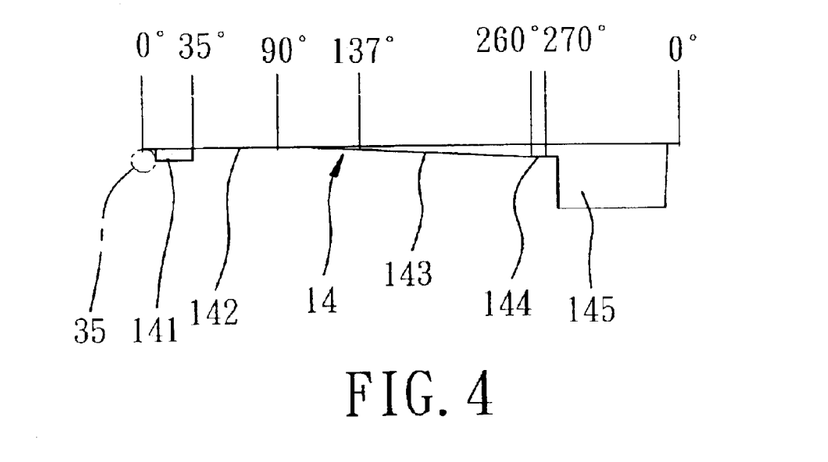
FIG. 4 is a view illustrating a first stop, a first flat section, an inclined section, second flat section, and a second stop of the cam edge when laid on a flat plane.
Figure 5:
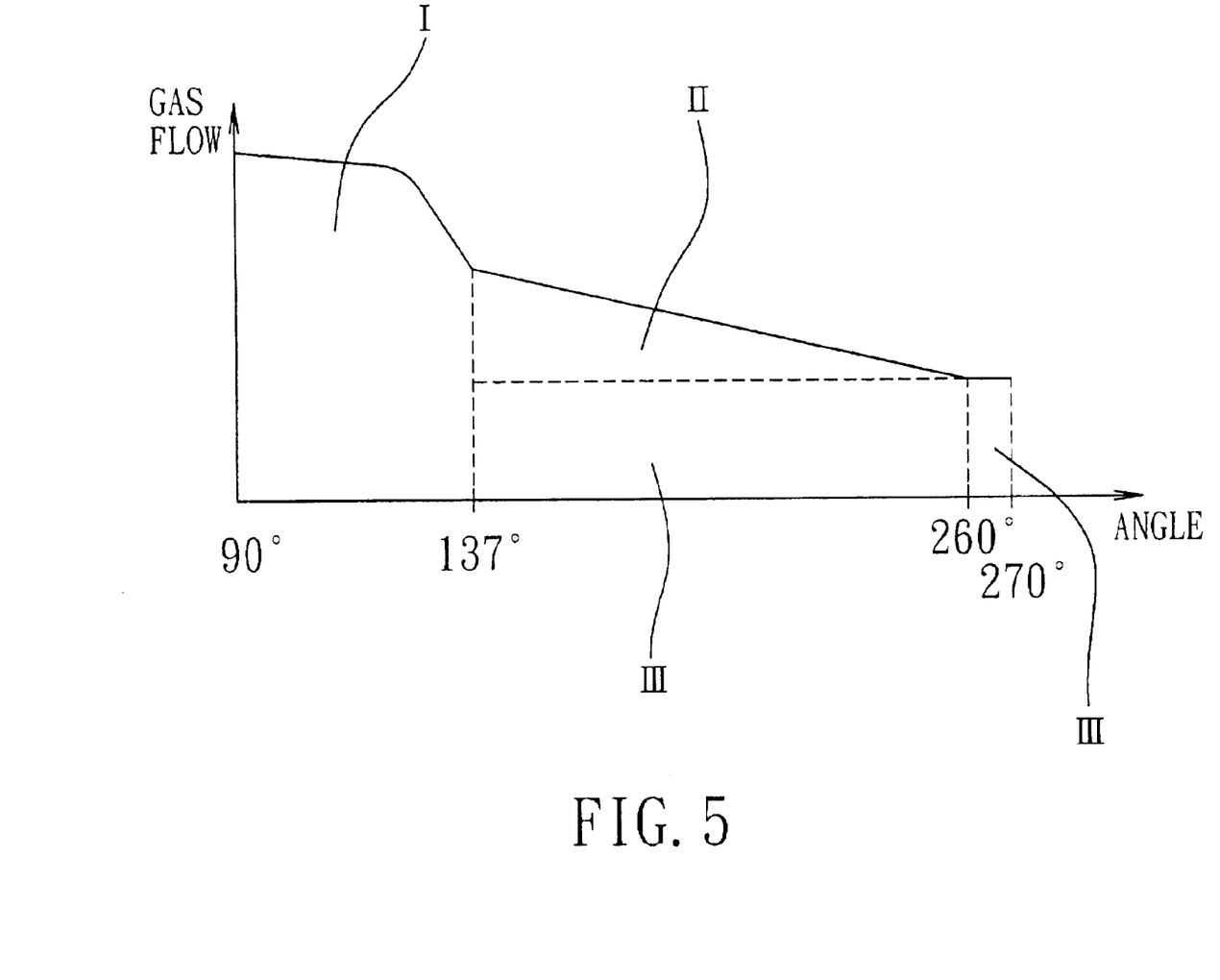
FIG. 5 is a plot illustrating the angular positions of the valve member and the corresponding amount of gas flow.

With further reference to FIGS. 3 and 4, the valve cap 12 of the valve housing 10 is formed with a cam edge 14 around the valve coupling portion 31. The cam edge 14 controls extent of translation of the valve piece 33 along the axis when the valve stem 30 is rotated about the axis. The valve coupling portion 31 is provided with a radial follower pin 35 that abuts against and that is slidable along the cam edge 14. Referring back to FIG. 2, the valve member 20 is formed with an axially extending notch 28 to receive the follower pin 35, thereby coupling co-rotatably the valve coupling portion 31 to the valve member 20 while permitting movement of the valve coupling portion 31 along the axis relative to the valve member 20. Preferably, the gas regulating valve further comprises a biasing spring 34 (see FIG. 1) for biasing the valve stem 30 to ensure abutment of the follower pin 35 against the cam edge 14. As shown in FIGS. 3 and 4, the cam edge 14 in this embodiment has a first stop 141 that corresponds to an initial angular position of the valve member 20, a first flat section 142 that extends from the first stop 141 and that corresponds to a maximum flow position of the valve member 20, an inclined section 143 that extends from the first flat section 142 and that corresponds to a regulating flow position of the valve member 20, a second flat section 144 that extends from the inclined section 143 and that corresponds to a minimum flow position of the valve member 20, and a second stop 145 that is disposed at one end of the second flat section 144 opposite to the inclined section 143 and that arrests further rotation of the valve member 20 in a direction away from the inclined section 143.

Figure 6:
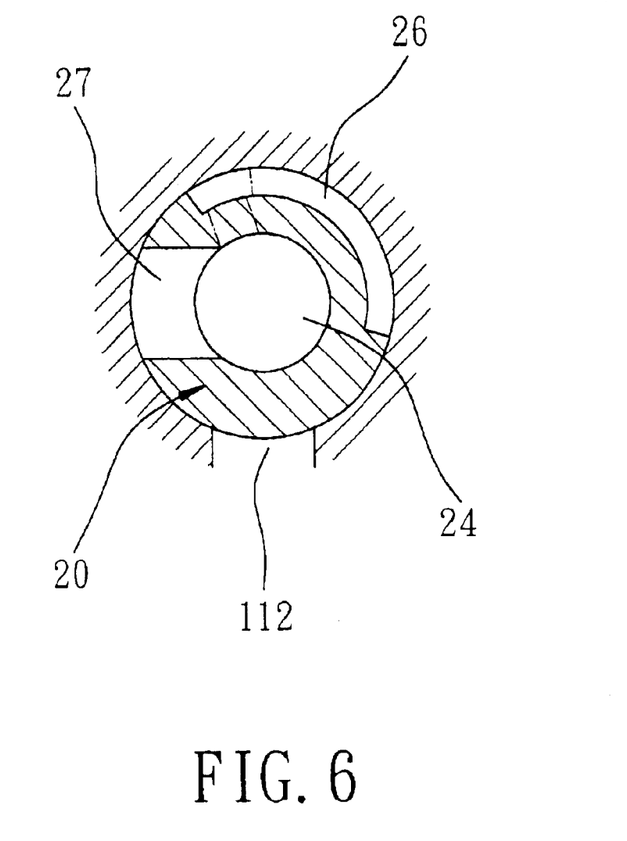
FIG. 6 is a sectional view illustrating a state where neither a radial aperture nor a gas feed channel is registered with a gas inlet bore.

With further reference to FIGS. 5 to 10, when the valve member 20 is at the initial angular position, i.e., at a 0-degree position, neither the radial aperture 27 nor the circumferentially extending section 261 of the gas feed channel 26 is registered with the gas inlet bore 112, as best shown in FIG. 6, and the follower pin 35 abuts against the first stop 141, as shown in FIG. 4. At this time, there is no gas flowing from the gas feed portion 23 into the gas supply portion 24.

Figure 7:
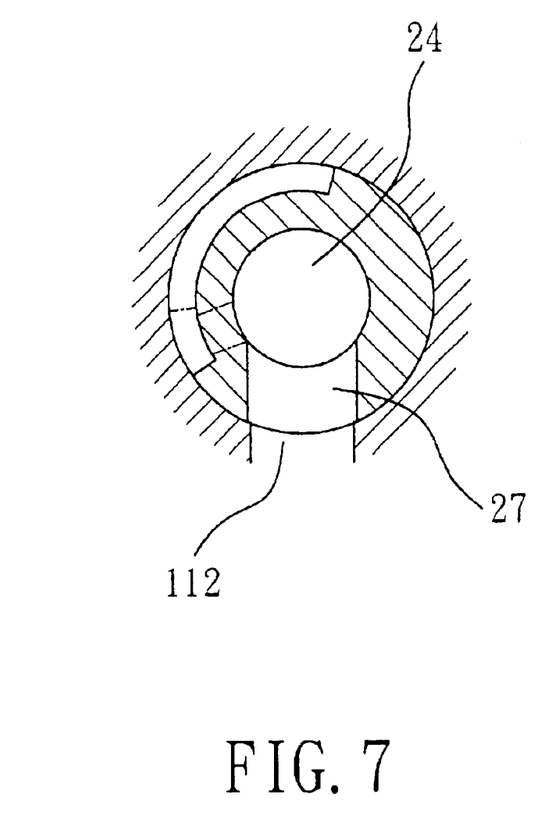
FIG. 7 is a sectional view illustrating a state where the radial aperture is registered with the gas inlet bore.

When the valve stem 30 is operated to rotate the valve member 20 from the initial angular position to the maximum flow position, i.e., a 90-degree position, the radial aperture 27 is registered with the gas inlet bore 112, as best shown in FIG. 7. During movement to the maximum flow position, the follower pin 35 moves past the first stop 141 and abuts against the first flat section 142. At this time, a maximum amount of gas flow (indicated as I in FIG. 5) flows from the gas inlet bore 112 into the gas supply portion 24 through the radial aperture 27. It is noted that sliding movement of the follower pin 35 along the first flat section 141 due to rotation of the valve stem 20 about the axis does not result in axial translation movement of the valve piece 33.

Figure 8:
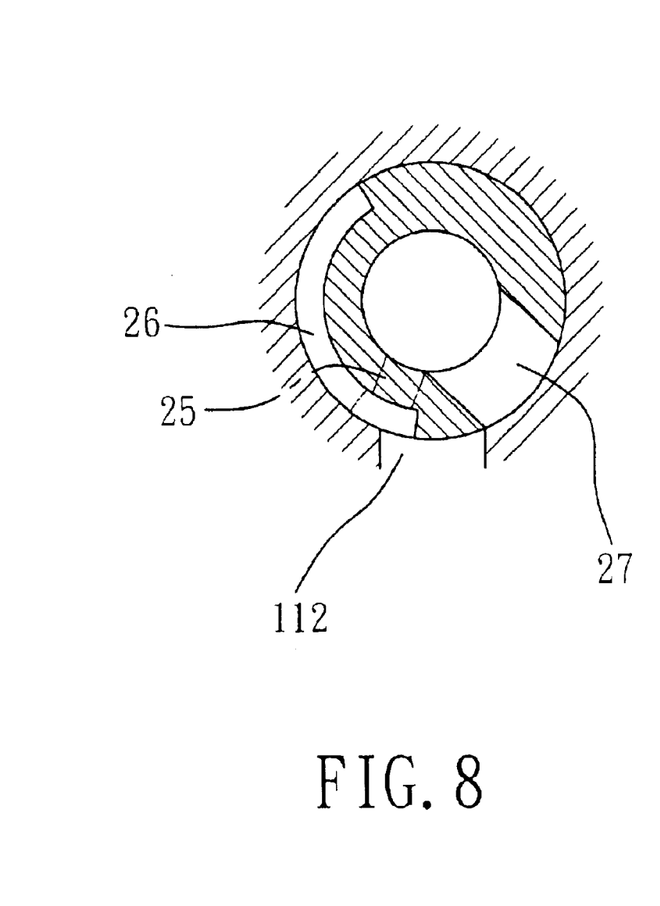
FIG. 8 is a sectional view illustrating a state where one end of the gas feed channel is registered with the gas inlet bore.
Figure 10:
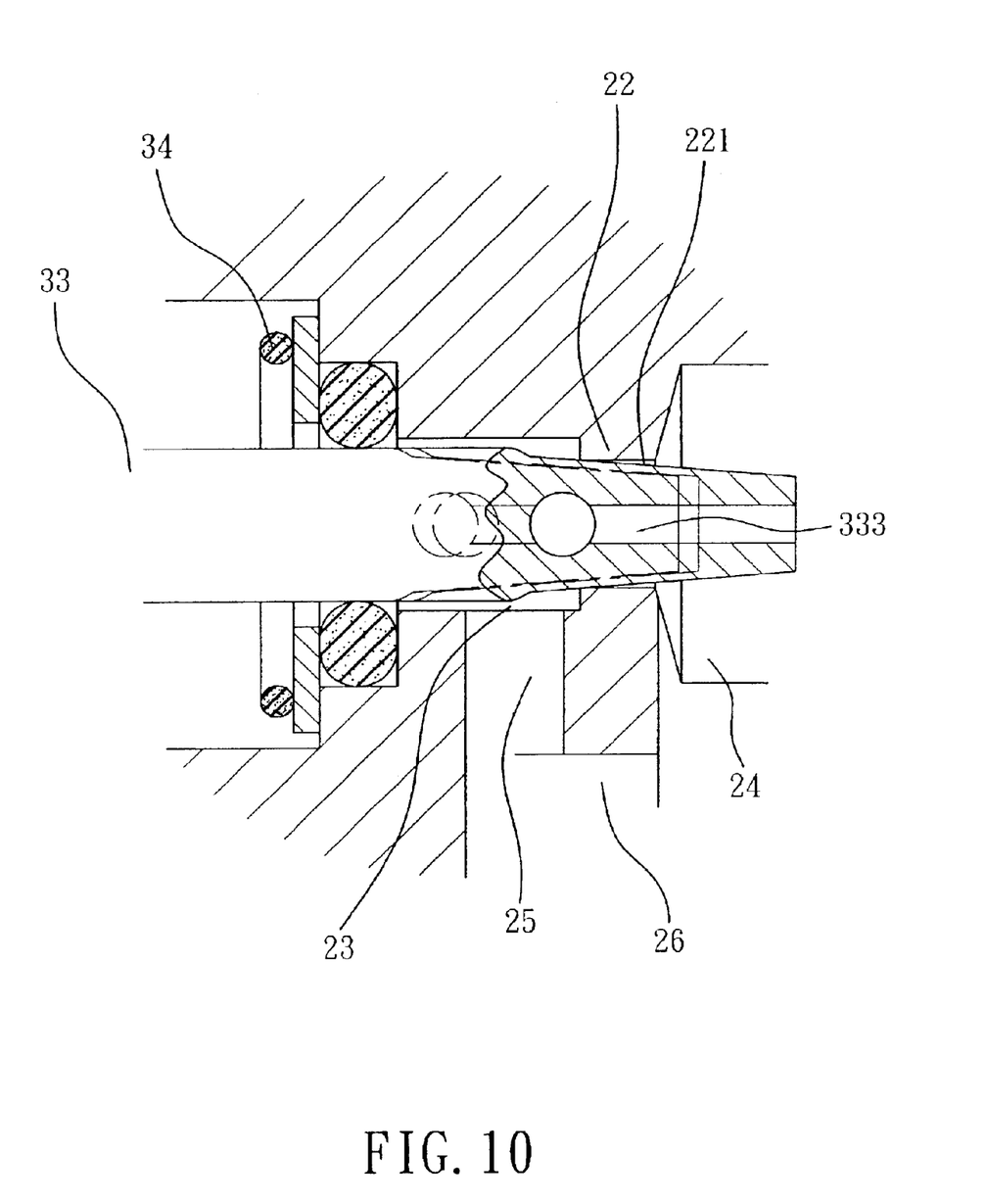
FIG. 10 is a fragmentary sectional view to illustrate how a valve piece translates toward and away from a valve opening.

When the valve stem 30 is operated to rotate the valve member 20 from the maximum flow position to the regulating flow position, i.e., within 137- to 260-degree positions, the circumferentially extending section 261 of the gas feed channel 26 is registered with the gas inlet bore 112, as best shown in FIG. 8, and the follower pin 35 abuts against the inclined section 143. At this time, gas does not flow into the gas supply portion 24 through the radial aperture 27. Instead, an amount of gas (indicated as II in FIG. 5) flows from the gas feed portion 23 into the gas supply portion 24 through the valve opening 221 in the valve seat 22. At the same time, an amount of gas (indicated as III in FIG. 5) also flows from the gas feed portion 23 into the gas supply portion 24 but through the gas passageway 333 in the valve piece 33. It is noted that sliding movement of the follower pin 35 along the inclined section 143 due to rotation of the valve member 20 from the maximum flow position to the regulating flow position results in axial translation movement of the valve piece 33 along the axis in the gas feed portion 23 of the valve member 20, wherein translation of the valve piece 33 toward and away from the valve opening 221 enables the valve piece 33 to respectively reduce and increase the amount of gas flowing from the gas feed portion 23 into the gas supply portion 24 through the valve opening 221, as best shown in FIG. 10. As such, the amount of gas (II) flowing from the gas feed portion 23 into the gas supply portion 24 through the valve opening 221 can be regulated.

Figure 9:
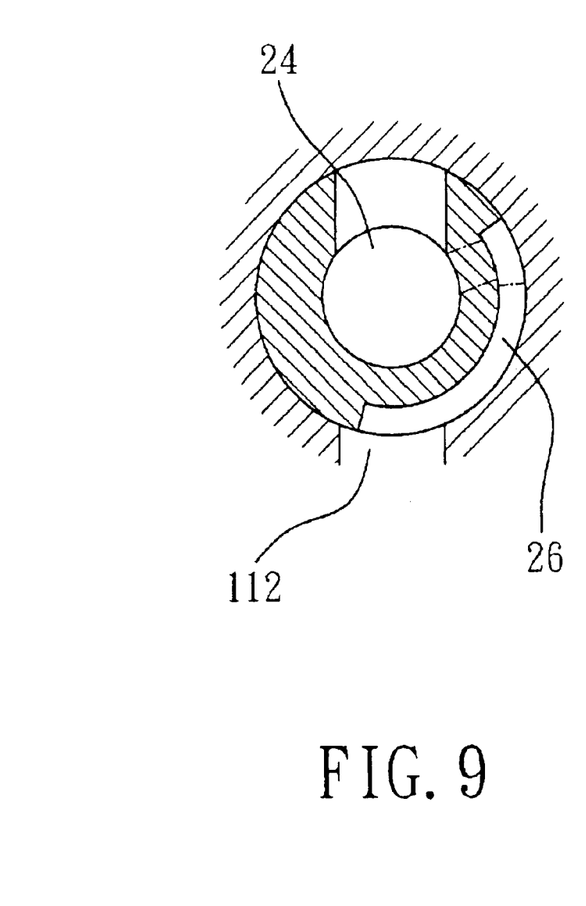
FIG. 9 is a sectional view illustrating a state where an opposite end of the gas feed channel is registered with the gas inlet bore.

When the valve stem 30 is operated to rotate the valve member 20 from the regulating flow position to the minimum flow position, i.e., within 260- and 270-degree positions, the circumferentially extending section 261 of the gas feed channel 26 is still registered with the gas inlet bore 112, as best shown in FIG. 9, but the follower pin 35 now abuts against the second flat portion 144. At this time, the gas flowing from the gas feed portion 23 into the gas supply portion 24 through the gas passageway 333 continues to flow. However, since the valve piece 33 blocks the valve opening 221, the gas flowing from the gas feed portion 23 into the gas supply portion 24 through the valve opening 221 is stopped. It is noted that sliding movement of the follower pin 35 along the second flat section 143 due to rotation of the valve stem 30 about the axis does not result in further axial translation movement of the valve piece 33, and that the amount of the gas flowing from the gas feed portion 23 into the gas supply portion 24 through the gas passageway 333 is maintained at a minimum.

It should be understood that the amount of gas (II) flowing from the gas feed portion 23 into the gas supply portion 24 through the valve opening 221 can be regulated regardless of the presence of the radial aperture 27 and the gas passageway 333. Further, since the valve piece 33 is coupled threadedly to the valve coupling portion 31, the valve piece 33 can be adjusted such that when the valve member 20 is rotated to a preset angular position, e.g., a 270-degree position, the valve piece 33 blocks completely the valve opening 221. Moreover, the coupling between the valve stem 20 and the valve cap 12 should not be limited to the aforesaid cam edge 14 and follower pin 35. By providing the valve stem 20 with a helical groove that engages a pin on the valve cap 12, rotation of the valve stem 20 relative to the valve cap 12 can also result in simultaneous axial translation of the valve stem 20 relative to the valve cap 12.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A gas regulating valve comprising:

a valve housing confining an interior space and formed with a stem opening for access into said interior space, said stem opening having an axis, said interior space having a stem mounting portion and a valve mounting portion respectively disposed proximate to and distal from said stem opening along said axis, said valve mounting portion being confined by an inner wall surface that surrounds said axis, said inner wall surface being formed with a radially disposed gas inlet bore that is adapted to be connected to a gas source;

a tubular valve member received in said valve mounting portion of said interior space and rotatable about said axis, said valve member having an outer valve surface in sliding contact with said inner wall surface of said valve mounting portion and an inner valve surface that surrounds said axis and that defines a valve space, said inner valve surface being formed with a radial inward annular valve seat that defines a valve opening registered with said axis, said valve seat dividing said valve space into a gas feed portion and a gas supply portion respectively disposed proximate to and distal from said stem opening along said axis, said gas supply portion being adapted to be disposed in fluid communication with a gas consuming device, said valve member being provided with a gas feed orifice that is formed through said inner and outer valve surfaces and that is in fluid communication with said gas feed portion, said outer valve surface being formed with a gas feed channel to fluidly communicate said gas feed orifice with said gas inlet bore when said valve member is rotated about said axis to register said gas feed channel with said gas inlet bore; and a valve stem having an operating stem portion disposed outwardly of said valve housing, and a valve coupling portion extending along said axis from said operating stem portion into said stem mounting portion through said stem opening, said valve coupling portion being provided with a frusto conical valve piece distal from said operating stem portion, said valve piece extending along said axis into said gas feed portion of said valve member and having a smallest cross-section smaller than said valve opening in said valve seat, said valve coupling portion being coupled co-rotatably to said valve member and being movable along said axis relative to said valve member, said valve coupling portion being further coupled rotatably to said valve housing such that rotation of said operating stem portion about said axis results in corresponding rotation of said valve member and further results in translation of said valve piece along said axis in said gas feed portion of said valve member, translation of said valve piece toward said valve opening enabling said valve piece to reduce amount of gas flowing from said gas feed portion into said gas supply portion through said valve opening, translation of said valve piece away from said valve opening enabling said valve piece to increase the amount of gas flowing from said gas feed portion into said gas supply portion through said valve opening.

2. The gas regulating valve as claimed in claim 1, wherein said valve piece further has a largest cross-section larger than said valve opening.

3. The gas regulating valve as claimed in claim 2, wherein said valve piece is formed with a gas passageway that extends along said axis and that permits fluid communication between said gas feed portion and said gas supply portion through said gas passageway.

4. The gas regulating valve as claimed in claim 3, wherein said valve member is further provided with a radial aperture that is formed through said inner and outer valve surfaces, that is in fluid communication with said gas supply portion, and that is angularly spaced apart from said gas feed channel, said radial aperture fluidly communicating said gas supply portion with said gas inlet bore when said valve member is rotated about said axis to register said radial aperture with said gas inlet bore.

5. The gas regulating valve as claimed in claim 4, wherein said valve housing is formed with a cam edge around said valve coupling portion, and said valve coupling portion is provided with a radial follower pin that abuts against and that is slidable along said cam edge, said cam edge controlling extent of translation of said valve piece along said axis when said valve stem is rotated about said axis.

6. The gas regulating valve as claimed in claim 5, wherein said gas feed channel includes a circumferentially extending section to be registered with said gas inlet bore and having opposite ends angularly spaced apart from said radial aperture, and an axially extending section extending from said circumferentially extending section to said gas feed orifice.

7. The gas regulating valve as claimed in claim 6, wherein said cam edge has
  a first stop corresponding to an initial angular position of said valve member where neither said radial aperture nor said circumferentially extending section of said gas feed channel is registered with said gas inlet bore,
  a first flat section extending from said first stop, said valve stem being axially movable relative to said valve housing and being rotatable about said axis to cause said follower pin to move past said first stop and to abut against said first flat section when said valve member is rotated from the initial angular position to a maximum flow position where said radial aperture is registered with said gas inlet bore, wherein sliding movement of said follower pin along said first flat section due to rotation of said valve stem about said axis does not result in axial translation movement of said valve piece,
  an inclined section extending from said first flat section, said follower pin abutting against said inclined section when said valve member is rotated from the maximum flow position to a regulating flow position where said circumferentially extending section of said gas feed channel is registered with said gas inlet bore, and gas flows through said gas passageway in said valve piece, wherein sliding movement of said follower pin along said inclined section due to rotation of said valve member from the maximum flow position to the regulating flow position results in axial translation movement of said valve piece toward said valve opening in said valve seat until said valve piece blocks said valve opening,
  a second flat section extending from said inclined section, said follower pin abutting against said second flat section when said valve member is rotated from the regulating flow position to a minimum flow position where said circumferentially extending section of said gas feed channel is registered with said gas inlet bore, said valve piece blocks said valve opening in said valve seat, and gas flows through said gas passageway in said valve piece, wherein sliding movement of said follower pin along said second flat section due to rotation of said valve stem about said axis does not result in axial translation movement of said valve piece, and
  a second stop disposed at one end of said second flat section opposite to said inclined section to arrest further rotation of said valve stem in a direction away from said inclined section.

8. The gas regulating valve as claimed in claim 5, further comprising a biasing spring for biasing said valve stem to ensure abutment of said follower pin against said cam edge.

9. The gas regulating valve as claimed in claim 5, wherein said valve housing includes a main body formed with said valve mounting portion, and a valve cap mounted on said main body and formed with said stem opening and said stem mounting portion, said cam edge being formed on said valve cap.

10. The gas regulating valve as claimed in claim 1, wherein said valve piece is coupled threadedly to said valve coupling portion.

11. The gas regulating valve as claimed in claim 1, wherein said valve housing is formed with a cam edge around said valve coupling portion, and said valve coupling portion is provided with a radial follower pin that abuts against and that is slidable along said cam edge, said cam edge controlling extent of translation of said valve piece along said axis when said valve stem is rotated about said axis.

12. The gas regulating valve as claimed in claim 11, wherein said valve housing includes a main body formed with said valve mounting portion, and a valve cap mounted on said main body and formed with said stem opening and said stem mounting portion, said cam edge being formed on said valve cap.

13. The gas regulating valve as claimed in claim 11, further comprising a biasing spring for biasing said valve stem to ensure abutment of said follower pin against said cam edge.

14. The gas regulating valve as claimed in claim 11, wherein said valve member is formed with an axially extending notch to receive said follower pin, thereby coupling co-rotatably said valve coupling portion to said valve member while permitting movement of said valve coupling portion along said axis relative to said valve member.

15. The gas regulating valve as claimed in claim 1, wherein:
  said inner wall surface is further formed with a radially disposed gas outlet bore that is adapted to be connected to the gas consuming device;
  said valve member having an open end that permits fluid communication between said gas supply portion and said gas outlet bore.

\* \* \* \* \*